March 5, 1968
R. O. SCHERTZ
3,371,886
AIRCRAFT ADAPTED FOR HIGHWAY USAGE
Filed Jan. 14, 1966
3 Sheets-Sheet 1
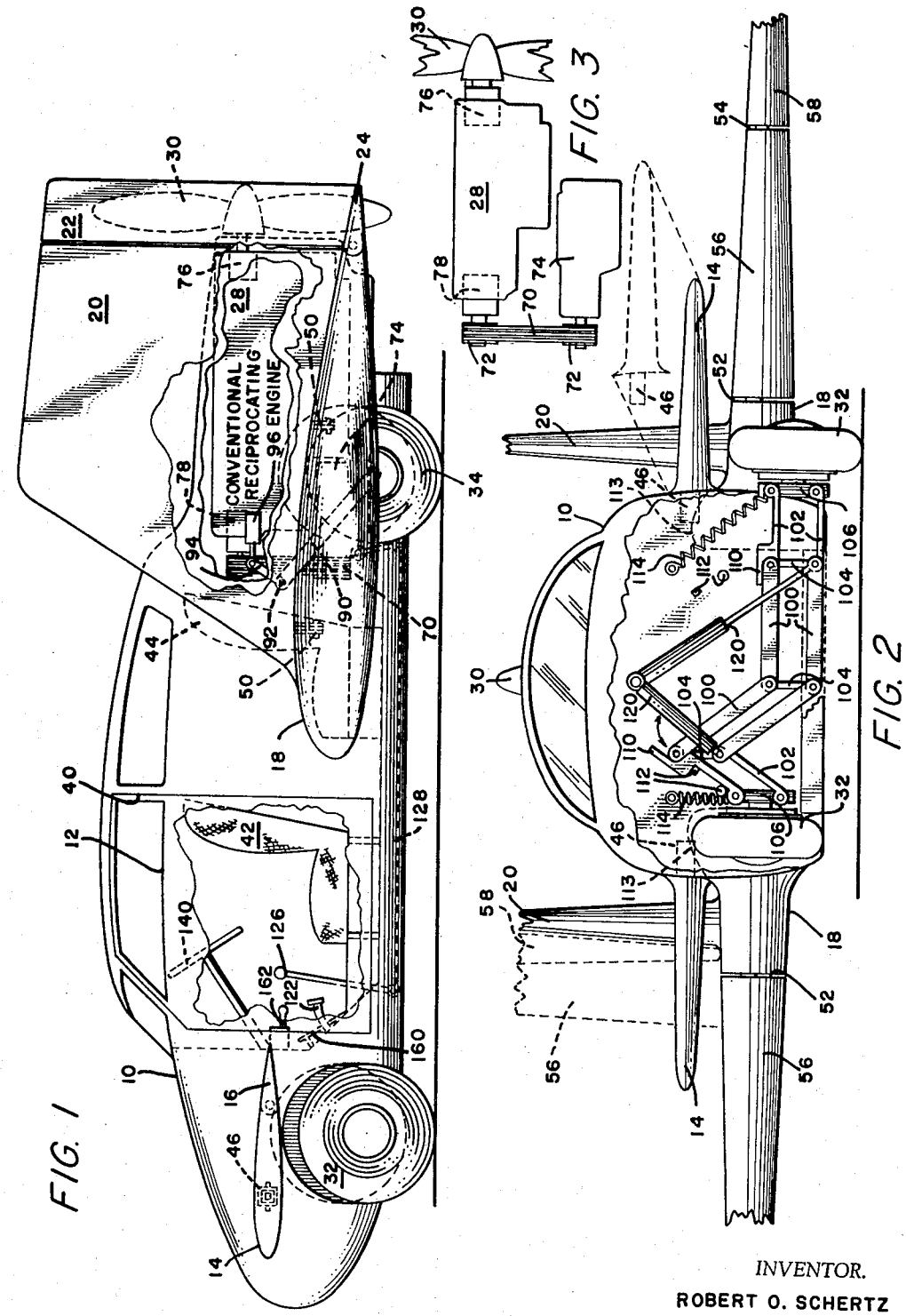
INVENTOR.
ROBERT O. SCHERTZ
BY
ATTORNEY

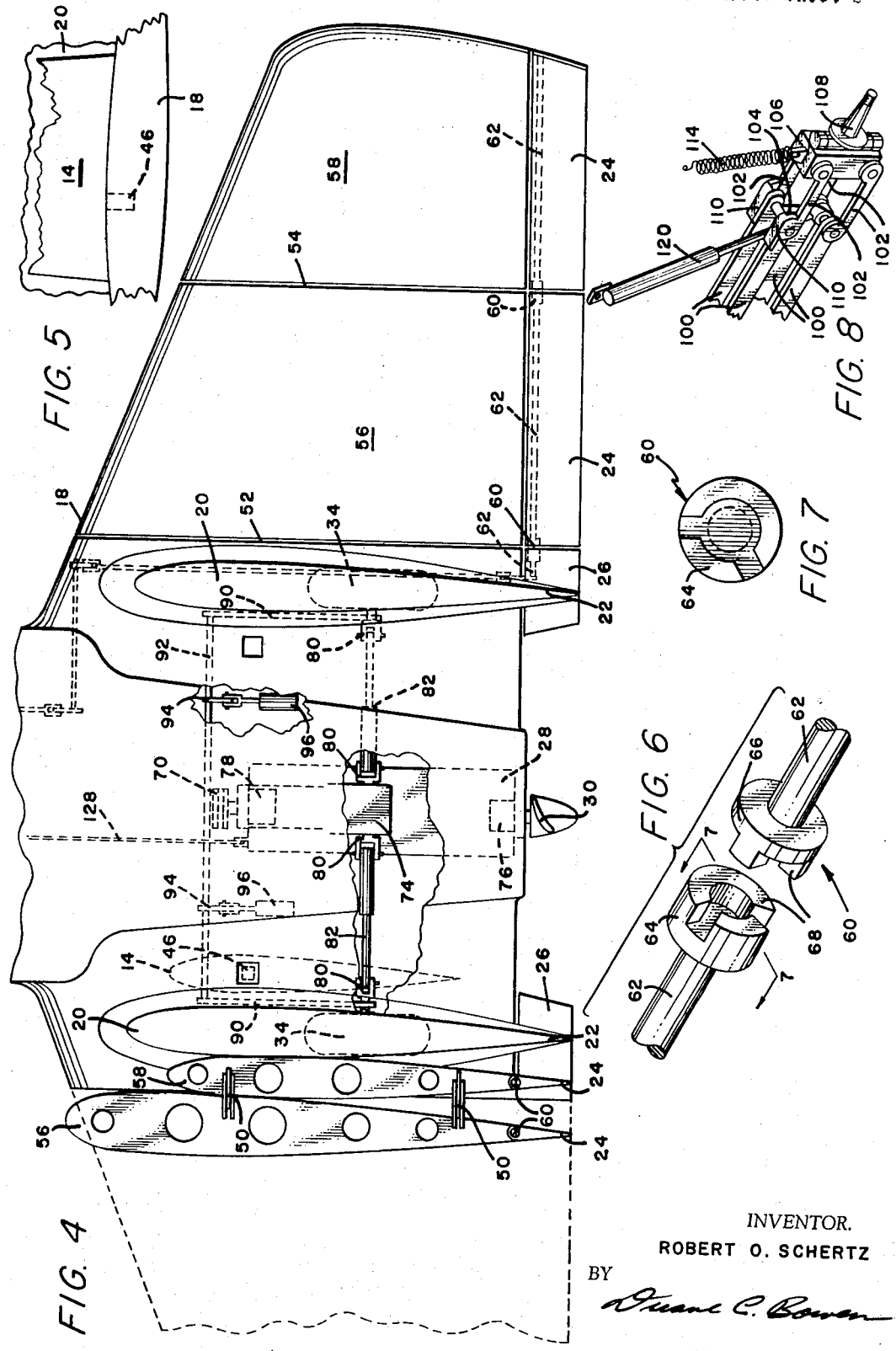

March 5, 1968 R. O. SCHERTZ 3,371,886
AIRCRAFT ADAPTED FOR HIGHWAY USAGE
Filed Jan. 14, 1966 3 Sheets-Sheet 3
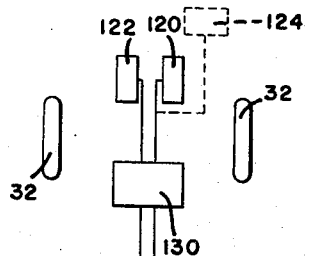
FIG. 9
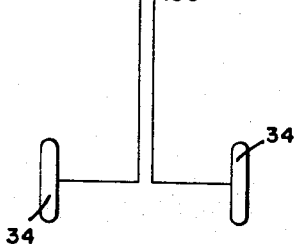
FIG. 10
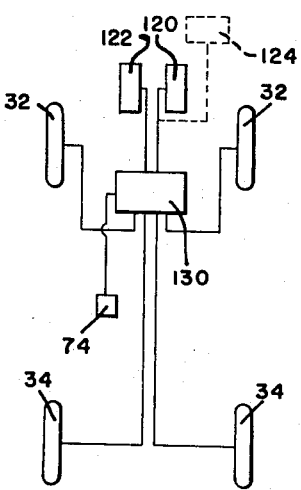
FIG. 12
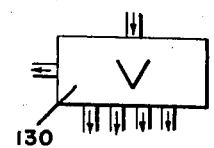
FIG. 11
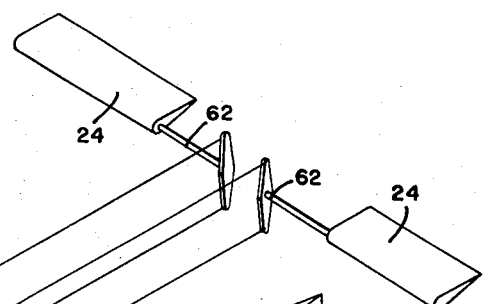
FIG. 14
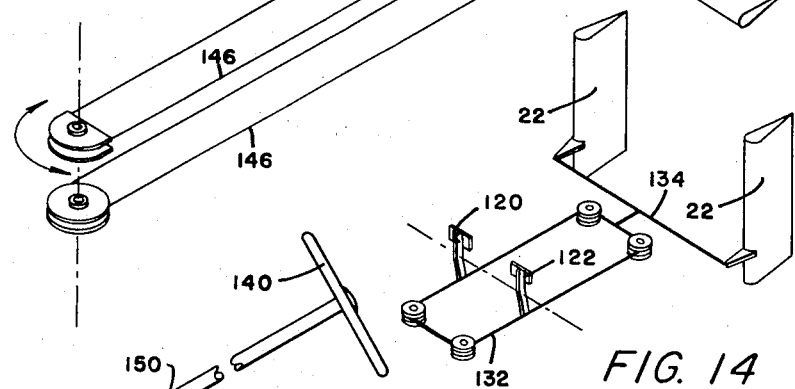
FIG. 13
INVENTOR.
ROBERT O. SCHERTZ
BY
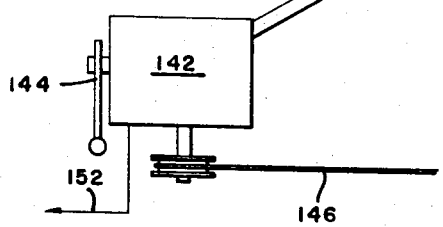
ATTORNEY

United States Patent Office 3,371,886
Patented Mar. 5, 1968

3,371,886
AIRCRAFT ADAPTED FOR HIGHWAY USAGE
Robert O. Schertz, 12 E. 2nd St.,
El Paso, Ill. 61738
Filed Jan. 14, 1966, Ser. No. 520,732
12 Claims. (Cl. 244—2)

ABSTRACT OF THE DISCLOSURE

An aircraft adapted for highway travel has a canard configuration; a removable forward horizontal stabilizer; rear foldable main load-carrying wings; a side opening cabin door between horizontal stabilizer and main wings; wheel means used for highway travel, takeoff and landing, and retractible during flight; a power plant used for highway travel and flight, and controls having dual highway and flight usage.

My invention relates to an aircraft usable for highway travel when needed and to achieve this adaptability includes a canard configuration, a removable horizontal stabilizer, foldable main load-carrying wings, wheel means adapted for highway usage and for retraction during flight, related flight controls and automotive type controls, and other features.

In the light plane field it would often be desirable to have an air auto vehicle usable for highway travel as well as flight. At present an operator of a light plane has to provide other surface transportation to and from his home airfield and at other airfields to get between airport and other destinations. Most often at airfields away from home he must bear the expense of renting a car or using taxis and public transportation to get from airport to other destinations whether a half-mile away or many miles from the nearest landing facility. Business usage of a light plane by an owner can involve trips to large cities, smaller communities, rural areas (as in farm related enterprises), or relatively unsettled areas (as in oil and gas drilling, mining prospecting, and ranching related businesses). Conventional light aircraft are particularly limited in many types of vacationing wherein it would be desirable to fly to the general area but then the vacationers want to travel on highways through areas or want to get to one or more locations remote from airports. Such an aircraft also has potential military uses.

Reduced visibility and low ceiling weather have a definite adverse effect upon the use and practicability of conventional aircraft. A roadable type aircraft would make it possible to safely complete trips in this vehicle even though a part of the trip was to be made through unflyable weather.

In fact, the applications for an aircraft adapted for highway travel are pertinent on occasion or frequently to most business or private light airplane owners to save money and time or for convenience. For example, a private light plane owner to reach his home airfield usually has to drive himself to the airport and leave the car there (and sometimes pay parking charges) and his family is unable to use it in his absence; or another member of his family must accompany him on his departure and meet him on his arrival (however inconvenient the hour or circumstances) in order that the family is able to use the car in his absence, or he must pay for transportation other than his own automobile.

Owning a light plane may be difficult to finance in the family budget and may be foregone partly because of inconvenience, extra expenses for surface transportation away or at home, or even the purchase of an additional car to avoid the situation outlined. The economic importance of dual air and highway usage will be understood as to a family that can substitute such aircraft and a single automobile for a conventional aircraft, a first car and a second car. Many business light plane owners, large or small, will have similar considerations of expense and convenience.

It is an object of my invention to devise an aircraft usable for highway travel to meet the above needs of present and potential, private and business light plane owners.

An observation should be made at this point that a practical aircraft usable for highway travel should substantially increase light plane sales because the additional usefulness and the reduction in expenses of such aircraft over conventional aircraft could be the decisive factor in sales to parties now indecisive on purchase. It can be safely forecast that air and surface travel will undergo substantial changes in the relatively near future because this prediction is in keeping with the rate and type of present technological development, and an aircraft usable in highway travel is consistent with those technological developments and is one of the forms those changes may take.

Of course to meet the needs it is not enough merely to provide an aircraft that qualifies under the minimum requirements to travel down a highway. The vehicle, instead, must have due convenience, economy, etc. The conventional automobile is at a high state of development and, in general, the more details the aircraft has that are comparable to those of such automobile the better for highway transportation. Conversely, the conventional light aircraft is highly developed and, in general, the more similar the vehicle is to such aircraft the better for flight purposes. However, direct combination of conventional automobile and aircraft features is inapplicable as there is not sufficient compatibility and dual usefulness for much direct copying of features, although the development of systems having some similarity is possible and leads to suitable compromises. It is an object of my invention to provide an aircraft usable for highway travel having as much similarity to conventional aircraft and automobiles as is suitable and is compatible with arriving at the best overall design.

The design of automotive vehicles is difficult and the design of aircraft may be even more difficult because of the requirements of air flight, the great importance of minimizing weight, safety problems, etc. Aircraft design is particularly complex in arriving at final compromises among desirable features, needed characteristics, and absolute requirements. It is an object of my invention to make the best possible compromises among desirable features, needed characteristics and absolute requirements for air and highway travel including such factors as providing suitable speed in the air and on the highway; minimizing weight, sales price, maintenance and other costs, fuel consumption, and complexity; providing due safety, riding comfort, visibility in air and highway use, rapid change between flight and highway configurations, good flight and highway control characteristics, etc.

To list only a part of the considerations in more detail, the wheels should be retractable, should adapt for landing, and should have supports including resilient means for highway travel which lead to a safe and comfortable ride. The controls in flight should be like those in aircraft and the controls in highway travel should be like those in automobiles and the operator should be able to readily shift from one to the other, and dual use of some system components is desirable to minimize cost, weight, etc. The maximum width of the vehicle during highway travel (which will be understood to primarily involve main load carrying wings and horizontal stabilizer) must not exceed legal limits which are usually eight feet, and I have provided wing folding and horizontal stabilizer removal to achieve this end. I have arrived at a canard configuration partly because of the need for highway visibility like that of the ordinary automobile, as the canard configuration puts the horizontal stabilizer (which is small compared with the main load-carrying wing) up front where it can be removed to achieve such visibility. Having the main wing aft permits having front doors not obstructed by wing structure, which is a feature convenient for passengers in getting in and out of the vehicle. Further objects of my invention include devising the best solution to the above and other design subjects.

My invention will be best understood, together with other objectives and advantages of my vehicle, from a reading of the following description, read with reference to the drawings, in which:

FIGURE 1 is side view of an aircraft forming a specific embodiment of my invention, portions being broken away to show hidden structure.

FIGURE 2 is a front view of the aircraft of FIGURE 1 in which certain features involved in changing the structure between configurations for flight and for highway travel are indicated in dotted lines.

FIGURE 3 is a partial side view of power plant and combined transmission and differential.

FIGURE 4 is a partial top view showing the wing in full lines on the right hand side in flight condition and on the left hand side in condition for highway travel.

FIGURE 6 is an enlarged perspective view of means at wing hinge joints for transmitting control movement to ailerons and adapted for disengagement upon wing folding.

FIGURE 7 is a view taken on line 7—7 of FIGURE 6 showing one of the elements in end view.

FIGURE 8 is a partial perspective view of front wheel support means adapted for wheel retraction during flight.

FIGURES 9 and 10 are schematical views of rudder pedal systems including, in FIGURE 9, the system adaptation for braking during takeoff and landing and, in FIGURE 10, the system adaptation for braking and clutching during highway travel.

FIGURE 11 is a schematical view of the control valve of the FIGURES 9 and 10 systems.

FIGURE 12 is a view in perspective of elevator control system details.

FIGURE 13 is a side view of control means for steering during highway travel and for elevator and aileron control in flight configuration.

FIGURE 14 is a view in perspective of rudder control by rudder pedals.

The drawings show an aircraft configuration adaptable for flight or for highway travel and includes fuselage 10, passenger compartment 12, horizontal stabilizers 14, elevator 16, main load-supporting wings 18, vertical stabilizers 20, rudders 22, ailerons 24, flaps 26, power plant 28, propeller 30, front wheels 32, and rear wheels 34.

The aircraft has canard configuration with horizontal stabilizer 14 mounted forwardly on fuselage 10 in extended position, main load-carrying wings 18 to the rear, and propeller 30 rearwardly directed in a pusher manner. The canard configuration is considered to be of considerable importance in designing an aircraft practical for both flight and highway travel. One feature is that horizontal stabilizer 14 is removable from its extended portion so that forward vision in highway travel is not impeded. In fact, the forward structure of the fuselage 10, passenger compartment 12 and front wheels 32 has strong similarity to the configuration of a conventional automobile once the horizontal stabilizer is removed. This is consistent with the objective of the invention to design as closely as is practical to an automobile for highway travel and as closely as practical to a conventional light aircraft for flight purposes. It will be noted, however, that this objective, can be met only partly and involves various compromises, but the general philisophy is that the conventional automobile and light plane are at a high state of development, are well adapted for their purposes, and the present design will benefit by considerable similarity.

Another advantage of a canard configuration is that the side-opening front doors 40 are behind horizontal stabilizer 14, and the main wing 18 is positioned aft of front doors 40 so that passengers have access to the front seat 42 in the normal manner of a two-door car without having to climb over wing structure, etc., in the manner of many airplanes. Although the vehicle may be adapted for carrying various numbers of people, it is shown as basically four-place with two people on front seat 42 and two people on seat 44 behind the front seat. It will be understood that for highway travel, more people could be carried in the manner of an automobile but for aircraft use because of maximum passenger weight consideration an aircraft is designed as two-place, four-place, etc.

Horizontal stabilizer 14 is shown in dotted lines on the right in FIGURE 2 as being removed. Stabilizer 14 may be stored on the aircraft during highway travel in various places, such as behind rear seat 44, but it is shown in FIGURES 4 and 5 as being stored with one section on the inner side of each vertical stabilizer 20. The securing means 46 for horizontal stabilizer 14 in flight condition can be accommodated in stored position in a recess in wing 18 (as shown in FIGURE 5) and conveniently can be made part of the securing system in stored condition.

There are other advantages of the canard configuration including the propeller is to the rear (and in fact is partly boxed in by rudders 22) which minimizes danger to passengers getting in and out of the vehicle etc.; the propeller has high efficiency in this rear pusher position; propeller and engine are remote from passenger compartment 12 to minimize noise; and power plant 28 is in a position involving minimum length (and weight) of transmitting means to get power to rear wheels 34 and the engine weight is above rear wheels 34 which is advantageous for traction purposes.

Twin vertical stabilizers 20 are mounted on main wing 18. As before observed, this canard configuration avoids problems of forward visibility in highway travel which would be present if main wing 18 were forward. Of course a basic problem in highway use of aircraft is to reduce width in the configuration for highway travel to the maximum legal limit for a highway transportation vehicle. This limit is eight feet in most localities in the United States. This maximum width for highway travel is achieved in my vehicle as to the main load-carrying wing (which is the widest part of an aircraft) by wing folding.

Wing folding is accomplished by providing hinges 50 at two locations 52 and 54 at each side of the wing medial portion, thereby forming inner wing end portions 56 and outer wing end portions 58. The hinges can include suitable locking means for the wing in flight and in folded portions or separate lock means can be provided. Systems connecting to the wing must be adapted for such folding and these may be adapted to be hinged or disconnected during wing folding (and adapted for automatic re-engagement). FIGURES 6 and 7 show such means 60 associated with the torque tubes 62 involved in aileron control and include interengaging parts 64, 66 with tongue and groove means 68 adapted for automatic disengagement and re-engagement.

The wing folding is about horizontal axes provided by hinges 50 and involves pivoting outer wing end portions 58 into superposition to inner wing end portions 56 and pivoting inner wing portions 56 into upright positions wherein there is juxtaposition to vertical stabilizers 20, as shown in FIGURES 2 and 4. It will be seen that by these means, control of width to eight feet or less is provided, rear vision has minimum obstruction, the vehicle has good air flow characteristics for highway travel, and this is a good choice aesthetically for appearance in highway travel.

The power plant 28 is shown as basically a conventional reciprocating engine. It is connected to rear wheels 34 for highway travel by multiple V-belts 70 connecting between pulleys 72 on engine 28 and on the combined transmission and differential unit 74. Disengaging units 76, 78 are used respectively to disengage power to propeller 30 during highway travel and to disengage power to pulleys 72, V-belt 70, transmission-differential 74 and rear wheels 34 for flight.

Front wheels 32 and rear wheels 34 are designed to have much the same characteristics as in automobiles for highway travel, as will be understood to be desirable. The wheels, however, are retracted during flight and the wheel support system, etc., must be adapted for retraction (and also for takeoff and landing use). Means are provided, to connect the transmission-differential unit to the rear wheels 34, that will permit retraction; and these means include universal joints 80 connected to rear wheels and differential and a telescoping rod assembly 82 therebetween including inner and outer members connected together by splines for transmission of rotary force but permitting relative telescoping during retraction and extension of rear wheels, and accommodating rear wheel up and down movement during highway travel.

The rear wheel support unit includes pivotal supporting arms 90, and torque rods or tubes 92 in bearings (not shown) pivotally supporting arms 90. Torque members 92 connect the rear wheels to the vehicle in a resilient manner for passenger comfort and for safety during surface travel of the vehicle. Crank arms 94 on torque members 92, and hydraulic piston and cylinder assemblies 96 connected to cranks 94, are used to pivot arms 90. Note as shown in FIGURE 1 that in retracted position rear wheels 34 may extend below other structure so that in case of a wheels-up landing (by mistake or because of retraction system failure) the rear wheels will act to prevent other rear structure from skidding and will minimize damage.

Front wheel support and retraction is provided by an articulated parallelogrammatical structure including pivotally supported upper and lower inner parallel paired links 100, upper and lower outer parallel paired links 102 pivotally connected to links 100, an intermediate pivotally connected link 104, and pivotal connections between links 102 and support 106 which supports wheel axle 108 for pivoting about an upright axis for vehicle steering.

When front wheels 32 are brought down, the downward limit of movement is provided by arm abutments 110 on links 102 abutting against links 100. Links 102 are formed of resilient material thereby providing a resiliency in the support of front wheels 32 leading to passenger comfort and safety during surface travel of the vehicle. Outer links 102 abut against abutments 112 in retraction of the assembly and wheels 32 are forced against abutments into proper positions in wheel wells 113 by spring 114, acting between member 106 and fixed structure in the fuselage. Hydraulic piston and cylinder 120 acts to move the assembly between retracted and down positions and connects to fixed structure in the fuselage and to the pivotal joint between links 100 and 102.

Control systems are provided adapted for flight and for highway travel. The control systems are designed to be as much like aircraft and automobile systems as is feasible consistent with other considerations for operator ease and safety of operation, as the operator will do best in flight and in highway travel if his controls are most like those in aircraft and in automobiles respectively. However, common use of parts of the same systems for flight and for highway travel will reduce weight and cost, will reduce clutter of operator controls, and is otherwise desirable.

FIGURES 9, 10, and 11 show the braking system. In FIGURE 9 the right rudder pedal 120 controls the right rear wheel brake and the left rudder pedal 122 controls the left rear wheel brake for landing and takeoff in the flight configuration of the system. In FIGURE 10 the right rudder pedal 120 controls braking on all four wheels in the configuration of the system for highway travel. Left rudder pedal 122 controls the clutch of transmission-differential unit 74. Means 124 is provided for rudder locking during highway travel. Shifting of transmission is provided by the usual stick 126 connecting with transmission unit 74 through linkage 128 (see FIGURE 1). A shifter unit 130 is provided in the rudder pedal-braking-clutching system which is shown as having the form of a hydraulic valve which controls what movement of rudder pedals 120, 122 accomplish by means of control of hydraulic fluid flow to lines 1, 2, 3, 4 and 5, as will be readily understood by those familiar with hydraulics and control valving. It will be understood that braking and related functions have been provided having the characteristics of aircraft and automotive controls, but part of the systems are shared and conversion from flight usage to highway travel usage is accomplished merely by positioning of valve 130.

Normal rudder control in flight configurations is illustrated in FIGURE 14 and includes right and left rudder pedals 120, 122 which are shifted fore and aft in the normal aircraft rudder control method to produce movement in the cable system 132 which movement is transmitted to rudders 122 by the linkage 134.

Combined steering wheel, yoke and control column means is provided by the structure illustrated in FIGURES 12 and 13. The appearance is close to that of an automobile steering wheel. During highway travel, turning of steering wheel 140 controls (via gear box 142) steering of front wheels 32 through linkage 144. In flight configuration wheel 140 has the function of a steering yoke and rotary movement of wheel 140 is transmitted via gear box 142 to the pulley cable system 146 and then to torque tubes 62 to control ailerons 24. Elevator control is accomplished by fore and aft pivoting of the shaft structure 150 supporting wheel 140, in the manner of a control column, to produce movement via gear box 142 and the connecting means 152 forward to the elevator 16 on horizontal stabilizers 14 in order to produce elevator effects. Preferably shaft 150 is locked in position (as a part of the function of gear box 142) against fore and aft pivoting during highway usage. From the foregoing it will be understood how I combine the functions of automobile steering wheel, aircraft steering yoke, and control column in a manner making suitable compromise among desirable ends.

Other controls shown in FIGURE 1 include an accelerator pedal 160 for control of engine 28 during highway travel and a throttle 162 for control of engine 28 during flight.

From the foregoing it will be understood how I provide a vehicle having dual highway and flight usage. I have already outlined the need for the vehicle, the advantages thereof and the reasons for the various features shown, and I will not repeat the same. One advantage to the private owner not mentioned of having an aircraft that can travel on the highway is that the vehicle normally can be stored at home and even in an automotive type home garage rather than paying for storage room at an airport or leaving the vehicle out in the open. Maintenance of the aircraft can be accomplished at home, which is convenient and means that the operator can still be with his family while doing maintenance work, which is in keeping with aircraft operation being a family activity.

Of course one of the primary advantages of the vehicle is that it combines the functions of aircraft and automobiles and has many of the uses of each. In the structure shown this is accomplished without much sacrifice of function or convenience as compared with either a conventional automobile or a conventional light airplane. I have been able to design a vehicle with little increase in cost over a conventional light airplane.

Having thus described my invention, I do not wish to be understood as limiting myself to the precise details of construction shown but instead wish to cover those

I claim:

1. In an aircraft having main load-carrying wings and horizontal and vertical stabilizers mounted on a fuselage having a passenger cabin and adapted to travel on a highway during surface travel thereof in a manner like an automobile, the improvement, comprising:
   (a) said aircraft having front and rear wheel means for ground support and manually operable means to steer said front wheel means, said aircraft having a power plant and a propeller and shifter means operative selectively to apply power from said power plant to said propeller during flight and to disengage said propeller and to apply power to said rear wheel means during highway travel,
   (b) said main wings having hinge means operable for folding of wing ends located so that during highway travel the aircraft has a maximum width at said main wings no greater than the maximum legal width for highway transportation vehicles,
   (c) said aircraft having a conard configuration with said horizontal stabilizer forward and said main wings rearward, and said power plant having a rearwardly-directed propeller, and
   (d) a pair of vertical stabilizers on said main wings and said rear wheel means being retractable during flight into the wings and into the spaces provided by said vertical stabilizers.

2. The subject matter of claim 1 in which said aircraft has a control column shifting fore and aft for elevator control and has a means having yoke functions during flight for aileron control and said means having yoke functions also being connected to said front wheels for highway steering and means operable to disengage said means having yoke functions from aileron control for highway travel and to disengage said means having yoke functions from said front wheels for flight and lock means to secure said column from shifting fore and aft during highway travel.

3. The subject matter of claim 1 in which said horizontal stabilizer is removable and said aircraft having means to store said horizontal stabilizer upon removal.

4. The subject matter of claim 1 in which said fuselage has front door means rearward of said horizontal stabilizer forward of said main wings, said passenger cabin being four-place with forward seat means aligned with said front door means and with seat means for two behind said forward seat means.

5. The subject matter of claim 1 in which in retracted position portions of said rear wheel means project below said aircraft thereby providing skid support means during wheels-up landings.

6. The subject matter of claim 1 in which there are two hinge means for each wing end whereby there is an inner and an outer wing end portion pivotally joined and wing folding includes juxtaposing inner and outer wing end portions and also folding at the inner margin of said inner wing end portions.

7. The subject matter of claim 6 in which said hinge means are horizontal and wing folding is accomplished by upward folding of said outer wing end portions into superposition to said inner wing end portions and by upward folding of said inner wing end portions into upright positions.

8. The subject matter of claim 7 in which said hinge means are outward of said vertical stabilizers with the inner hinge means being adjacent to said stabilizers whereby when folded said wing end portions are alongside said stabilizers; and lock means for said wing end portions to secure them in flight and in folded positions.

9. The subject matter of claim 1 in which there are arms supporting the rear wheels and torsion bar means secured to said arms providing resiliency to rear wheels' support, operating means secured to said torsion bar means to pivot said rear wheels between down position for highway travel, landing, and takeoff, and retracted position for flight, a transmission and a differential connected to said power plant and connecting means between said differential and said rear wheels including a universal joint on each end and a telescoping member in between to accommodate movement of said rear wheels between down position and retracted position.

10. The subject matter of claim 1 in which each front wheel has means to support the same for movement between down position for highway travel, landing and takeoff and retracted position for flight including articulated parallelogrammatical arm means maintaining the wheel in substantially upright disposition and power means for operating said arm means to move said wheels between down and retracted positions, said arm means including resilient members providing resiliency to front wheel support.

11. An air auto vehicle for use as an airplane or as an automobile comprising
   a fuselage,
   main load-carrying wing means mounted on said fuselage,
      hinge means in said wings operable to fold said wings toward said fuselage, said hinge means having horizontal axes substantially parallel to the longitudinal axis of said fuselage,
   vertical stabilizer means mounted on said main wing means adjacent said fuselage,
   horizontal stabilizer means mounted forwardly on said fuselage in extended position to form a canard configuration,
      means for removing said horizontal stabilizer means from said extended position to reduce the overall vehicle width when used as an automobile,
   a passenger cabin in said fuselage,
   side-opening door means mounted on said fuselage between said horizontal stabilizer means and said main wing means to provide convenient passenger access to said cabin,
   front wheel means mounted on said vehicle,
   rear wheel means mounted on said vehicle,
   power plant means,
   rearwardly-directed propeller means, and
   coupling means for selectively coupling said power plant means to said rear wheel means or said propeller means.

12. The combination according to claim 1 further comprising
   rudder means on said vertical stabilizers,
   right and left rudder pedals coupled to said rudder means for control thereof,
   locking means operable during highway travel to lock said rudder means,
   two front wheels and two rear wheels, each of said wheels having brakes associated therewith,
   means connecting said right and left rudder pedals to the brakes on said right and left rear wheels, respectively,
   means connecting said right rudder pedal to the brakes on all four wheels,
   transmission means coupling said power plant to said rear wheels,
   clutch means interposed between said power plant and said transmission means,
   means connecting said left rudder pedal to said clutch means, and
   manually operable control means operative to shift rudder pedal function for highway travel so that (1) said right and left rudder pedals control the respective brakes on the right and left rear wheels, (2) said right rudder pedal controls the brakes on all four wheels, and (3) said left rudder pedal controls the clutch means.

References Cited

UNITED STATES PATENTS

| | | | |
|---|---|---|---|
| 1,731,757 | 10/1929 | Tubbe | 244—49 |
| 2,241,577 | 5/1941 | Beals | 244—49 |
| 2,363,550 | 11/1944 | Reichert | 244—45 X |
| 2,446,128 | 8/1948 | Clark | 244—2 X |
| 2,509,095 | 5/1950 | Fulton et al. | 244—2 |
| 2,811,323 | 10/1957 | Rethorst | 244—2 |
| 2,893,661 | 7/1959 | Aylor | 244—2 X |
| 2,940,688 | 6/1960 | Bland | 244—2 |
| 3,056,564 | 10/1962 | Zuck | 244—2 |

OTHER REFERENCES

Jane's All the World's Aircraft, 1945–46, The Macmillan Company, copyright 1946, pp. 231c–232c, copy in Scientific Library.

Advertisement for The Fulton Airphibian, received in Patent Office on Jan. 18, 1950, copy in Class 244—2.

MILTON BUCHLER, *Primary Examiner.*

T. MAJOR, *Assistant Examiner.*